United States Patent
Liu et al.

(10) Patent No.: US 12,235,136 B2
(45) Date of Patent: Feb. 25, 2025

(54) CONTROL METHOD AND CONTROLLER RELATED TO ELECTROMAGNETIC TRACKING

(71) Applicant: Metal Industries Research & Development Centre, Kaohsiung (TW)

(72) Inventors: Zong-Hsin Liu, Kaohsiung (TW); Po-Chi Hu, Kaohsiung (TW); I-Chiao Tsai, Kaohsiung (TW); Chih-Chung Lin, Kaohsiung (TW)

(73) Assignee: Metal Industries Research & Development Centre, Kaohsiung (TW)

( * ) Notice: Subject to any disclaimer, the term of this patent is extended or adjusted under 35 U.S.C. 154(b) by 212 days.

(21) Appl. No.: 18/076,296

(22) Filed: Dec. 6, 2022

(65) Prior Publication Data

US 2024/0183689 A1 Jun. 6, 2024

(51) Int. Cl.
*G01D 5/20* (2006.01)
*G01B 7/004* (2006.01)
*G01B 7/30* (2006.01)

(52) U.S. Cl.
CPC ............ *G01D 5/204* (2013.01); *G01B 7/004* (2013.01); *G01B 7/30* (2013.01)

(58) Field of Classification Search
CPC .. G01D 5/00; G01D 5/12; G01D 5/14; G01D 5/20; G01D 5/204; G01B 7/00; G01B 7/004; G01B 7/30
USPC ..... 324/200, 207.11, 207.13, 207.15, 207.16
See application file for complete search history.

(56) References Cited

U.S. PATENT DOCUMENTS

| | | | | |
|---|---|---|---|---|
| 5,187,475 A | * | 2/1993 | Wagener | G01B 7/003 324/207.13 |
| 9,000,756 B2 | * | 4/2015 | Fowler | G01D 5/145 324/207.16 |
| 2003/0062889 A1 | * | 4/2003 | Ely | G06F 3/046 324/207.17 |
| 2009/0153134 A1 | * | 6/2009 | Matsumoto | G01D 5/142 324/207.11 |
| 2011/0181273 A1 | * | 7/2011 | Iida | A61B 1/041 324/207.11 |
| 2012/0098523 A1 | * | 4/2012 | Iida | A61B 5/062 324/202 |
| 2019/0056242 A1 | | 2/2019 | Foster et al. | |
| 2020/0011955 A1 | | 1/2020 | Motz et al. | |
| 2020/0249286 A1 | | 8/2020 | David et al. | |

(Continued)

FOREIGN PATENT DOCUMENTS

| | | |
|---|---|---|
| CN | 101073497 | 11/2012 |
| TW | I449303 | 8/2014 |

OTHER PUBLICATIONS

"Office Action of Taiwan Counterpart Application", issued on Mar. 13, 2024, p. 1-p. 11.

*Primary Examiner* — Hoai-An D. Nguyen
(74) *Attorney, Agent, or Firm* — JCIPRNET

(57) ABSTRACT

A control method and a controller related to electromagnetic tracking are provided. In the method, a working position is determined, and the working position is the position at which a magnetic field sensor is located relative to a magnetic field emitter; an electrical characteristic of the magnetic field emitter or the magnetic field sensor is adjusted to a target characteristic corresponding to the working position. In this way, the positioning accuracy may be improved.

16 Claims, 7 Drawing Sheets

(56) References Cited

U.S. PATENT DOCUMENTS

2020/0272235 A1     8/2020  Ng
2023/0128615 A1*    4/2023  Kluge ................... G01D 5/145
                                                          324/207.15

* cited by examiner

CONTROL METHOD AND CONTROLLER RELATED TO ELECTROMAGNETIC TRACKING

BACKGROUND

Technical Field

The disclosure relates to an electromagnetic field positioning technology, and in particular to a control method and a controller related to electromagnetic tracking.

Description of Related Art

The electromagnetic tracking system may establish a controllable magnetic field space through an electromagnetic field generator (FG) (e.g., a transmitting coil), so as to determine the position and/or the direction of the magnetic sensing coil in the space. Therefore, electromagnetic tracking is often used in medical, robotics, and virtual reality applications where precision is required.

The general commercial electromagnetic tracking system is limited by the non-adjustable magnetic field gain, so the measurement distance is limited. In addition, the current gain tends to cause the effect that the uniform magnetic field area above the FG moves upwards, resulting in positioning accuracy measured by the sensor under the position near the surface of the FG becoming worse (referred to as dead volume), and the problem of occurrence of a sensing signal being saturated, thereby reducing a user's operating volume above the FG.

SUMMARY

Embodiments of the disclosure provide a control method and a controller related to electromagnetic tracking, which provide an adjustable magnetic field gain, thereby improving positioning accuracy and an operating area.

The control method in the embodiment of the disclosure includes (but is not limited to) the following steps: a working position is determined, and the working position is a position of a magnetic field sensor relative to a magnetic field emitter; an electrical characteristic of the magnetic field emitter or the magnetic field sensor is adjusted to a target characteristic corresponding to the working position.

The controller of the embodiment of the disclosure includes (but is not limited to) a communication transceiver and a processor. The communication transceiver is configured to receive a sensing value of the magnetic field sensor. The processor is coupled to the communication transceiver. The processor is configured to determine the working position according to the sensing value, and adjust the electrical characteristic of the magnetic field emitter or the magnetic field sensor to the target characteristic corresponding to the working position.

Based on the above, according to the control method and the controller related to electromagnetic positioning according to the embodiments of the disclosure, the magnetic field sensor or the electrical characteristic of the magnetic field sensor is adjusted according to the relative position between the magnetic field emitter and the magnetic field sensor. In this way, the signal-to-noise ratio (SNR) of the sensing signal obtained by the sensor at different positions may be improved, and a magnetic field gradient may be maintained, thereby providing precise positioning.

In order to make the aforementioned features and advantages of the disclosure comprehensible, embodiments accompanied with drawings are described in detail as follows.

DESCRIPTION OF THE EMBODIMENTS

Figure 1A:
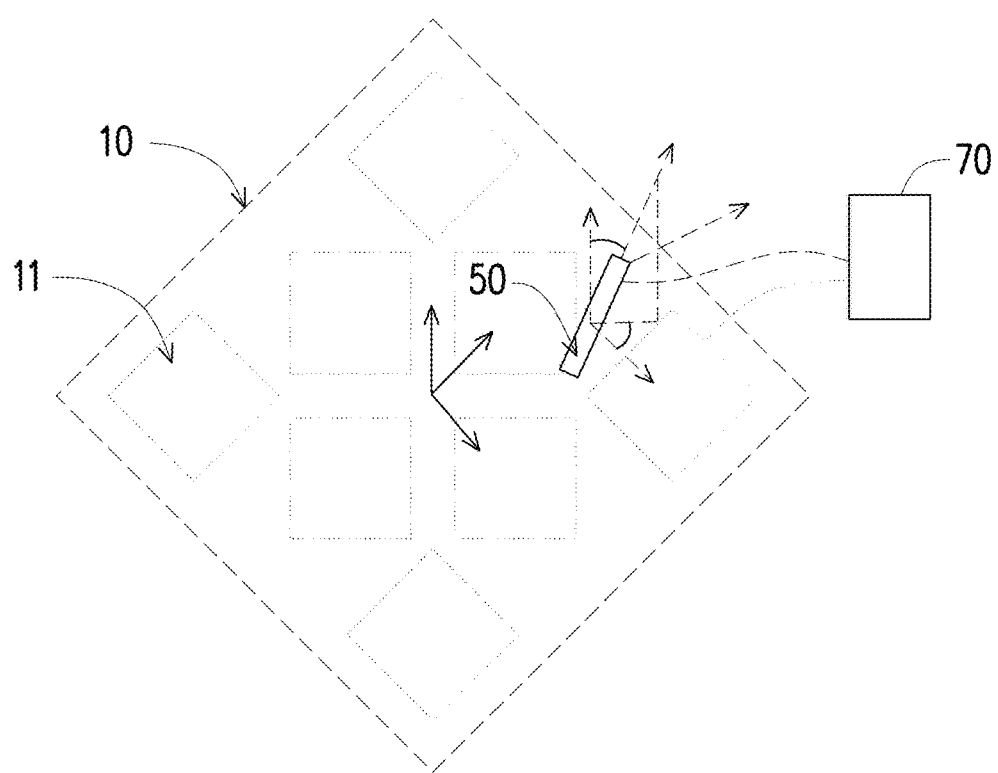
FIGS. 1A to 1C are schematic diagrams of a system according to an embodiment of the disclosure.
Figure 1B:
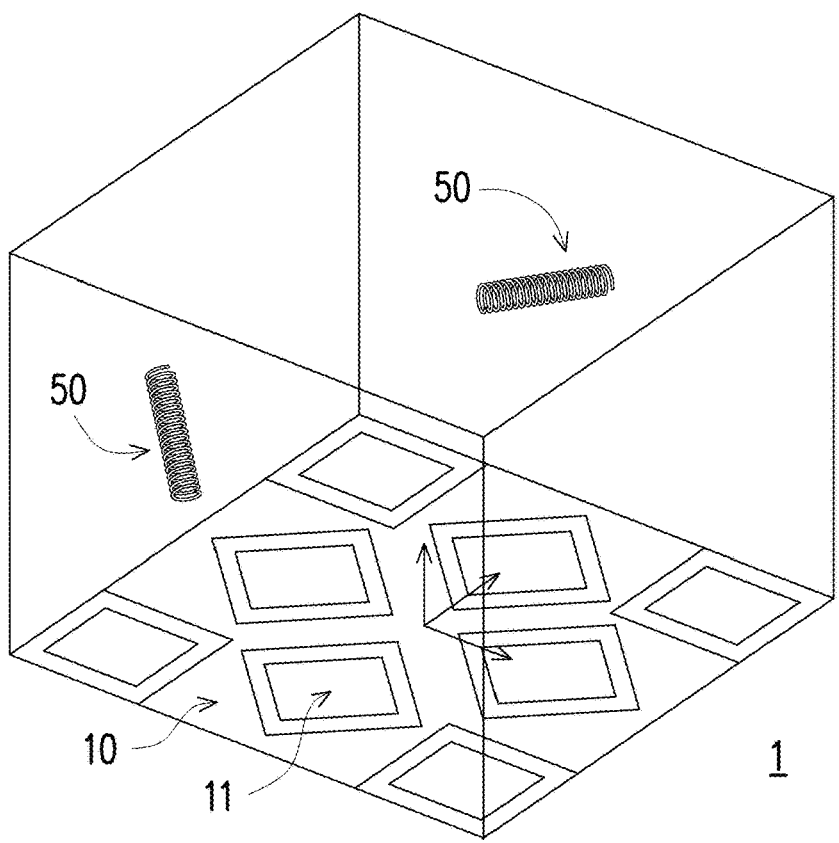
Figure 1C:
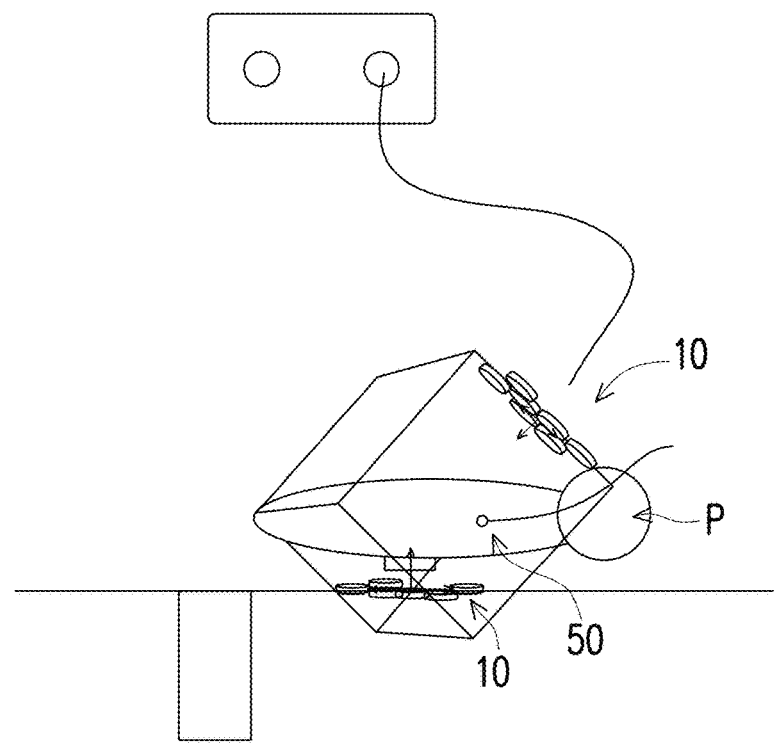

FIGS. 1A to 1C are schematic diagrams of a system 1 according to an embodiment of the disclosure. Referring to FIGS. 1A to 1C, the system 1 includes (but is not limited to) a magnetic field emitter 10, a magnetic field sensor 50, and a controller 70.

In an embodiment, the system 1 may be configured for electromagnetic field positioning. For example, (S1) a virtual space model of the magnetic field emitter 10 is established according to an origin and a turning point of a line segment; (S2) a current is fed in and magnetic sensing intensity at any point in space is measured to correlate magnetic field intensity with a spatial position; (S3) the magnetic field sensor 50 is introduced to establish a correlation between the magnetic field intensity and voltage (magnetic flux) change; (S4) transmitting coil magnetic field models of (S1) and (S2) are optimized; (S5) a position and a direction of the magnetic field sensor 50 are calculated (as shown in FIG. 1A) through experiments and model magnetic flux least square errors; (S6) a visualized three-dimensional environment is established according to coordinate information. In this way, the position and the posture of the magnetic field sensor 50 may be estimated based on the magnetic flux measured by the magnetic field sensor 50 (as shown in FIGS. 1B and 1C).

Taking FIG. 1C as an example, the magnetic field sensor 50 may be disposed on an organ of a person P, and a computer or other controllers may control radiation of the magnetic field emitter 10, measure the magnetic flux through the magnetic field sensor 50, and obtain the position and/or the posture of the organ accordingly.

It should be noted that there are many ways to realize electromagnetic field positioning, which are not limited by the embodiment of the disclosure. In addition, the system 1 may further have other application scenarios.

In an embodiment, the magnetic field emitter 10 includes multiple transmitting units 11.

Figure 2:
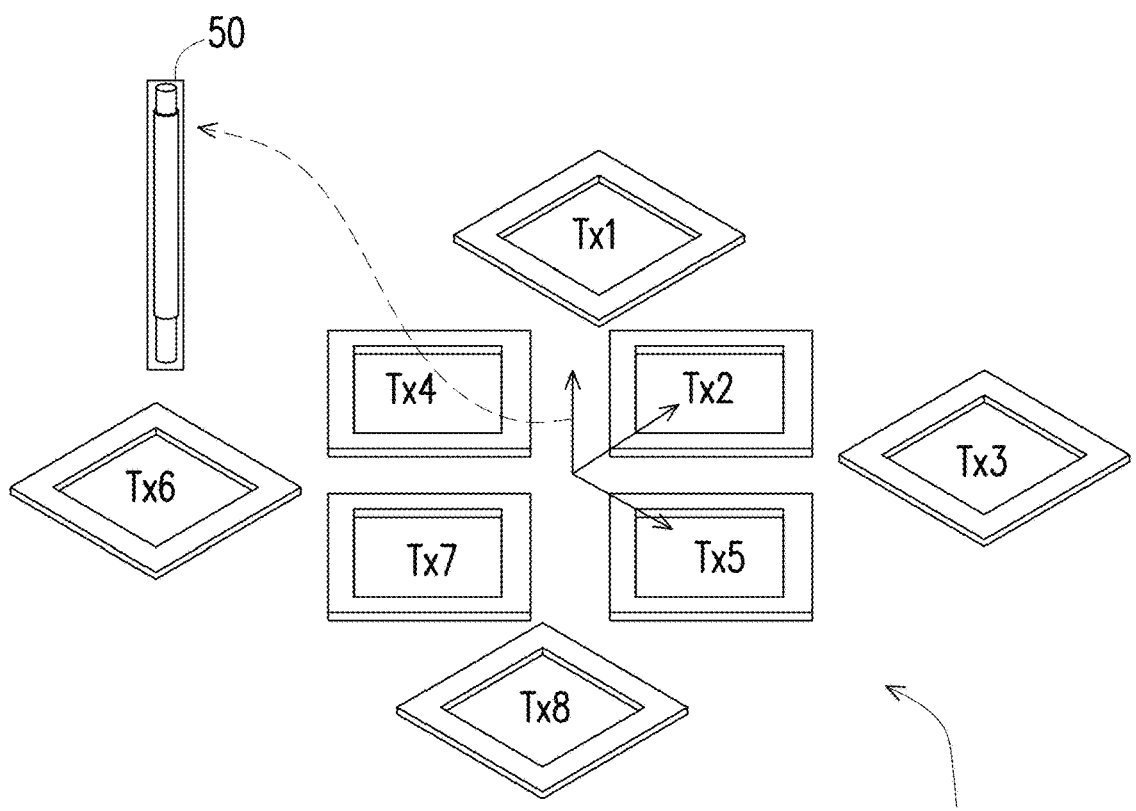
FIG. 2 is a schematic diagram of a magnetic field emitter and a magnetic field sensor according to an embodiment of the disclosure.

For example, FIG. 2 is a schematic diagram of a magnetic field emitter 10B and the magnetic field sensor 50 according to an embodiment of the disclosure. Referring to FIG. 2, the magnetic field emitter 10B includes multiple transmitting units Tx1, Tx2, Tx3, Tx4, Tx5, Tx6, Tx7, and Tx8. Each of the transmitting units Tx1, Tx2, Tx3, Tx4, Tx5, Tx6, Tx7, and Tx8 includes one or more planar transmitting coils. The planar transmitting coil in each of the transmitting units Tx1, Tx2, Tx3, Tx4, Tx5, Tx6, Tx7, and Tx8 is a helical coil formed according to a quadrilateral (but may also be a triangle, a hexagon or other polygons) surround made of wires (for example, made of copper, aluminum or other conductive materials) on a plane (for example, a horizontal plane, a vertical plane or any plane). The planar coil facilitates the realization of thinner and higher density design.

In an embodiment, each of the transmitting units Tx1, Tx2, Tx3, Tx4, Tx5, Tx6, Tx7, and Tx8 is disposed on a substrate by a stacking process. For example, the stacking process technology includes a printed circuit board (PCB), a flexible printed circuit (FPC), or low-temperature co-fired ceramic (LTCC).

The transmitting units Tx1, Tx3, Tx6, and Tx8 surround the transmitting units Tx2, Tx4, Tx5, and Tx7. Respective distances from the transmitting units Tx1, Tx3, Tx6, and Tx8 to a central point of the magnetic field emitter 10B are greater than the respective distances from the transmitting units Tx2, Tx4, Tx5, and Tx7 to the central point of the magnetic field emitter 10B. The transmitting units Tx1, Tx3, Tx6, and Tx8 are rotated by 45 degrees compared to the transmitting units Tx2, Tx4, Tx5, and Tx7.

It should be noted that there may be other variations in the number and arrangement of the transmitting units, and the transmitting units are not limited to the planar transmitting coils.

In an embodiment, each of the transmitting units Tx1 to Tx8 independently inputs a current (for example, an alternating current). The electrical characteristics of the transmitting units Tx1 to Tx8 are the same. The electrical characteristics are the voltage gains of the magnetic field emitter 10 and the magnetic field emitter 10B or the current gains of the magnetic field emitter and the magnetic field emitter 10B. For example, the voltage gains, the current gains and/or the current frequency of the transmitting units Tx1 to Tx8 may be the same. The electrical characteristics of the transmitting units Tx1, Tx3, Tx6, and Tx8 may be one to two times the electrical characteristics of the transmitting units Tx2, Tx4, Tx5, and Tx7. For example, the voltage gains and/or the current gains of the transmitting units Tx1, Tx3, Tx6, and Tx8 are one to two times of the voltage gains and/or the current gains of the transmitting units Tx2, Tx4, Tx5, and Tx7. For another example, the current frequency of the transmitting units Tx1 to Tx8 is different. The current frequency may be between 3 and 100 kilohertz (kHz). Thus, a composite uniform magnetic field may be generated.

The magnetic field sensor 50 includes a sensing unit (for example, one or more planar or columnar sensing coils). Taking the planar sensing coil as an example, the planar sensing coil is a helical coil formed according to a geometry surround made of wires (for example, made of copper, aluminum or other conductive materials) on a plane (for example, a horizontal plane, a vertical plane or any plane). In some embodiments, the geometry is a polygon (for example, a quadrilateral, a hexagon, or an octagon) or a circle.

In an embodiment, the sensing unit of the magnetic field sensor 50 is disposed on a flexible substrate by a stacking process. For example, the stacking process method includes a PCB, an FPC, or LTCC. The flexible substrate is, for example, a polyimide (PI) film or made of a biocompatible polymer material, which is adapted to stick on the surface of the body or stick to internal organs. In an embodiment, the wire is embedded with a ferrite core. The ferrite core has a feature of high magnetic permeability and may optimize the sensing voltage output, thereby increasing the system signal-to-noise ratio and reducing the position and direction errors.

It should be noted that the sensing unit is not limited to the planar or columnar sensing coil.

Figure 3:
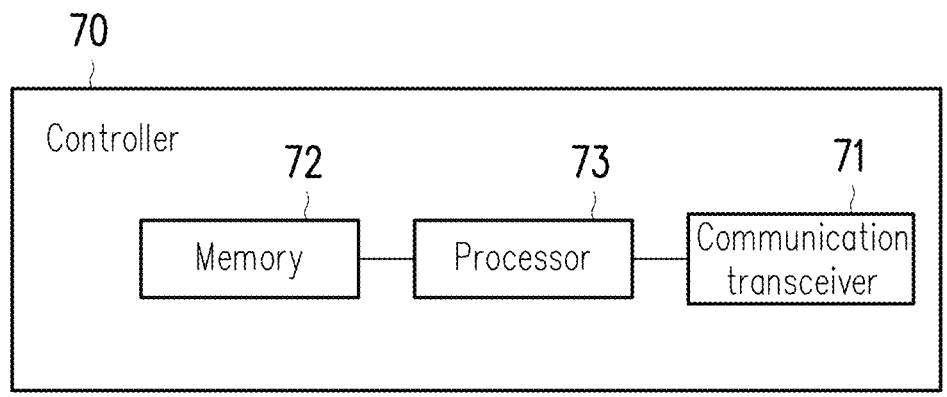
FIG. 3 is a block diagram of elements of a controller according to an embodiment of the disclosure.

FIG. 3 is a block diagram of elements of the controller 70 according to an embodiment of the disclosure. Referring to FIG. 3, the controller 70 includes (but is not limited to) a communication transceiver 71, a memory 72, and a processor 73.

The communication transceiver 71 includes (but is not limited to) an amplifier, an analog-to-digital converter, a filter, an oscillator, and/or a data acquisition interface card. In an embodiment, one or more communication transceivers 71 are connected to the magnetic field emitter 10 and the magnetic field sensor 50. The communication transceiver 71 may receive the sensing value (i.e., the intensity of the sensing signal) from the magnetic field sensor 50. In addition, the communication transceiver 71 may transmit a control command to the magnetic field emitter 10 and the magnetic field sensor 50. The control command is, for example, to adjust the electrical characteristics of the magnetic field emitter 10 and the magnetic field sensor 50. The electrical characteristic is, for example, the voltage gain of the magnetic field emitter 10, the current gain of the magnetic field emitter 10 or the voltage gain of the magnetic field sensor 50.

The memory 72 may be any type of fixed or removable random access memory (RAM), read only memory (ROM), flash memory, conventional hard disk drive (HDD), solid-state drive (SSD) or similar elements. In an embodiment, the memory 72 is configured to store program codes, software modules, configurations, data or files (for example, magnetic field numerical models, sensing values or parameters), which is to be described in detail in subsequent embodiments.

The processor 73 is coupled to the communication transceiver 71 and the memory 72. The processor 73 may be a central processing unit (CPU), a graphic processing unit (GPU), or other programmable general purpose or special purpose microprocessors, a digital signal processor (DSP), a programmable controller, a field programmable gate array (FPGA), an application-specific integrated circuit (ASIC), a neural network accelerator or other similar elements or combinations of the above elements. In an embodiment, the processor 73 is configured to execute all or a part of the operations of the controller 70, and may load and execute various program codes, software modules, files, and data stored in the memory 72. In some embodiments, some operations in the method of the embodiment of the disclosure may be implemented by different or the same processor 73.

Hereinafter, the method described in the embodiment of the disclosure is to be described with various devices, elements, and modules in the system 1. Each process of the method may be adjusted accordingly according to the implementation situation, and is not limited thereto.

Figure 4A:
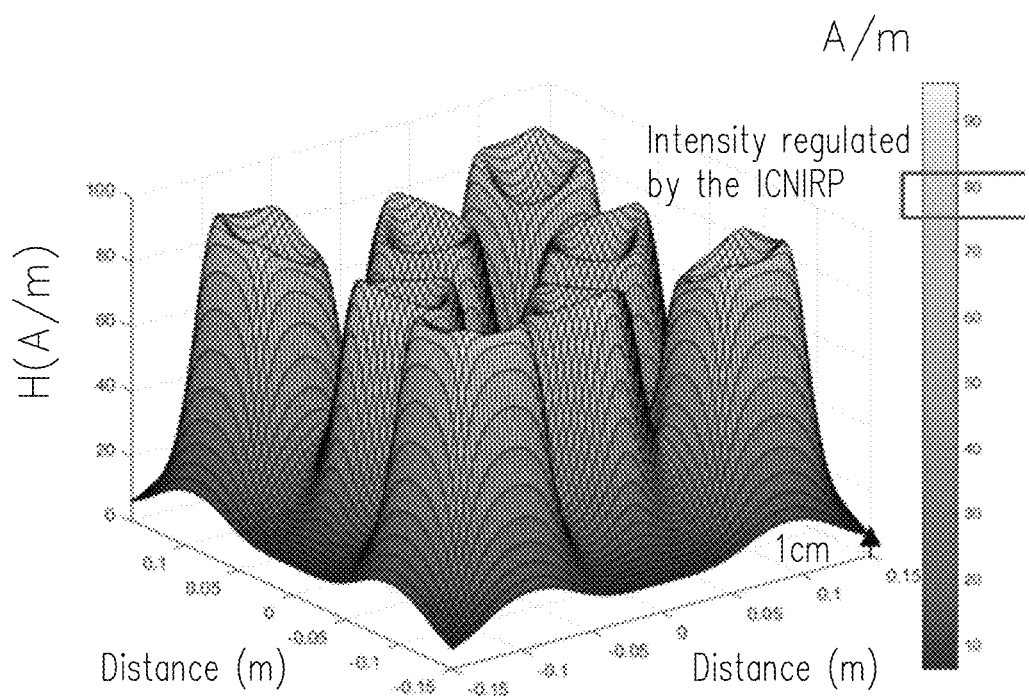
FIGS. 4A to 4C are schematic diagrams of magnetic field intensity at different sensing positions at a fixed current gain.
Figure 4B:
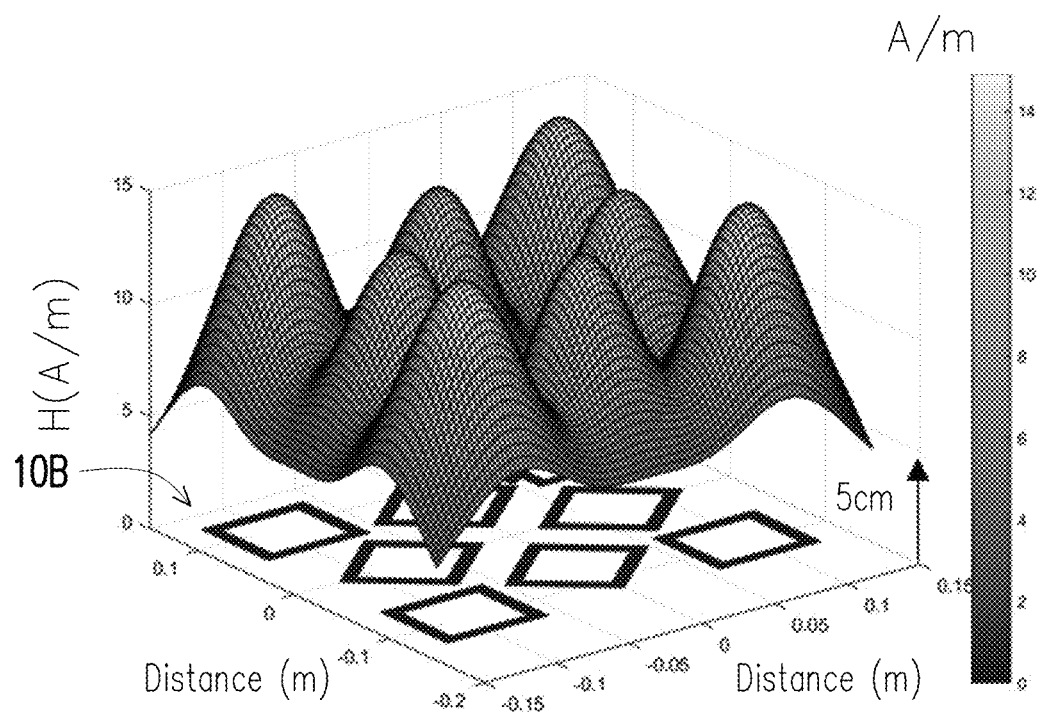
Figure 4C:
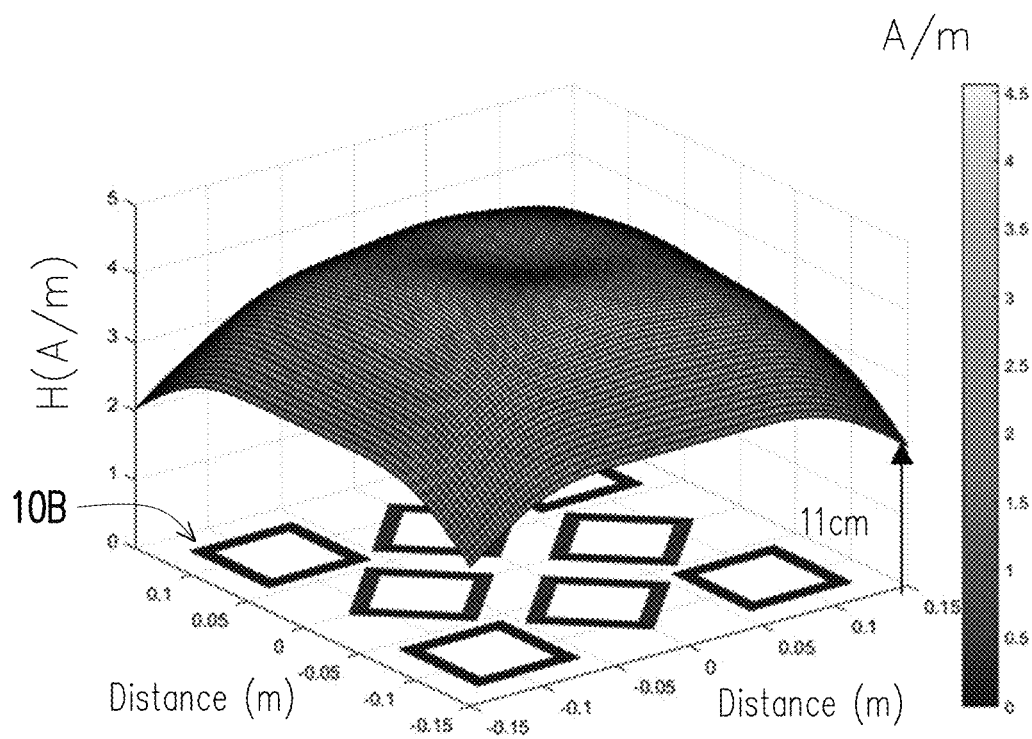

It is worth noting that FIGS. 4A to 4C are schematic diagrams of magnetic field intensity at different sensing positions at a fixed current gain. Please refer to FIGS. 4A to 4C, which simulate the magnetic field intensity when the magnetic field sensor 50 is located at 1 centimeter (cm) (i.e., 10 millimeters (mm)), 5 cm (i.e., 50 mm), and 11 cm (i.e., 110 mm) above the magnetic field emitter 10, respectively, and the current is 0.25 ampere (A). When the distance between the magnetic field sensor 50 and the magnetic field emitter 10 is 10 mm to 50 mm, the amplitude of the magnetic field is not uniform (i.e., the amplitude varies greatly), and the signal-to-noise ratio (SNR) corresponding to sensing at certain positions is particularly small, resulting in positioning errors. Compared with the distance between 10 mm to 50 mm, when the distance between the magnetic field sensor 50 and the magnetic field emitter 10 is 110 mm, the amplitude of the magnetic field is more uniformly distributed, which may provide more precise positioning. In light of the above, if the current gain cannot be properly adjusted, the relative position of the magnetic field sensor 50 and the magnetic field emitter 10 may greatly affect the positioning effect. When the current gain is increased, such a situation may further cause the effect that the uniform magnetic field moves away from the magnetic field emitter 10, resulting in poorer positioning accuracy close to the magnetic field emitter 10. In addition, it is known through simulations or experiments that the farther the distance between the magnetic field sensor 50 and the magnetic field emitter 10 leads to the gradual decrease in the magnetic field change, resulting in the change in the magnetic field gradient (for example, magnetic field components Bx, By, and Bz) slowing down, the fringe magnetic field intensity of the magnetic field emitter 10 being relatively weak, and the SNR of the magnetic field signal received by the magnetic field sensor 50 being directly affected. Therefore, discerning small magnitude position change in the magnetic field sensor 50 may be difficult. In addition, due to the low SNR and the slowing of the magnetic field gradient, deducing the precise position by measuring change in the magnetic flux of smaller magnitudes is more difficult. In light of the above, improving the existing control mechanism of electromagnetic tracking is necessary.

Figure 5:
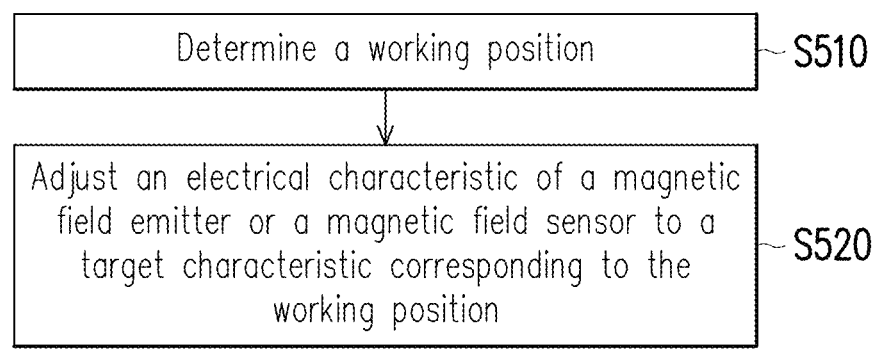
FIG. 5 is a flowchart of a control method according to an embodiment of the disclosure.

FIG. 5 is a flowchart of a control method according to an embodiment of the disclosure. Referring to FIG. 5, the processor 73 determines a working position according to the sensing value obtained by the communication transceiver 71 from the magnetic field sensor 50 (step S510). Specifically, the working position is the position of the magnetic field sensor 50 relative to the magnetic field emitter 10. An example is the distance between the magnetic field sensor 50 and the magnetic field emitter 10. Another example is the height of the magnetic field sensor 50 when the magnetic field emitter 10 is located on a reference plane.

The processor 73 may first control the magnetic field emitter 10 to provide an estimated current gain. The magnetic field sensor 50 measures the magnetic flux (i.e., the sensing value). The processor 73 may perform a spatial positioning calculation according to the magnetic flux. In an embodiment, the spatial positioning algorithm is, for example, the Biot-Savart law, in which the magnetic field is related to the magnitude, the direction, and the distance of the current. The Biot-Savart law may analyze magnetic flux density (B) of any current-carrying line segment (I) in the magnetic field emitter 10 at any point in space, and the magnetic field distribution at the plane height may be drawn accordingly. The processor 73 may deduce the working position of the magnetic field sensor 50 according to the magnetic flux (i.e., the sensing value).

In an embodiment, a number of measurement locations may be planned in advance, and the measurement values (for example, the magnetic flux) may be obtained at these measurement locations through the magnetic field sensor 50, thereby generating a corresponding relationship between the magnetic flux and the position and the posture or a mathematical model related to the magnetic field value. The memory 72 may pre-store the corresponding relationship or the mathematical model between the magnetic flux and the position and the posture. The processor 73 may load the relationship or the mathematical model, and estimate the position and the posture corresponding to the magnetic field sensor 50 according to the sensing value of the magnetic field sensor 50. The position is, for example, a coordinate of a three-dimensional coordinate system. The posture may be an included angle with a horizontal reference plane and a vertical reference plane.

The processor 73 adjusts the electrical characteristic of the magnetic field emitter 10 or the magnetic field sensor 50 to the target characteristic corresponding to the working position (step S520). Specifically, different working positions may provide different electrical characteristics. The electrical characteristic is, for example, the voltage gain of the magnetic field emitter 10, the current gain of the magnetic field emitter 10, the current frequency of the magnetic field emitter 10 or the voltage gain of the magnetic field sensor 50. One of the purposes of changing the electrical characteristic is to maintain the magnetic field intensity of the space between the magnetic field emitter 10 and the magnetic field sensor 50, and maintain the signal-to-noise ratio corresponding to the sensing signal of the magnetic field sensor 50 accordingly. For example, the difference in the signal-to-noise ratio is smaller than the corresponding threshold value.

In an embodiment, the magnetic field intensity of the space between the magnetic field emitter 10 and the magnetic field sensor 50 may be in the range of 0.5 to 10 amperes per meter (A/m) in response to the operation of the target characteristic by the magnetic field emitter 10 or the magnetic field sensor 50. That is, the processor 73 controls the magnetic field emitter 10 or the magnetic field sensor 50 to operate according to the target characteristic. In addition, the magnetic field intensity at any position in the space between the magnetic field emitter 10 and the magnetic field sensor 50 may be between 0.5 to 10 A/m or greater than 5 A/m. In this way, the sensing signal of the magnetic field sensor 50 has a higher signal-to-noise ratio and a gentler gradient change, thereby ensuring subsequent positioning can be accurate.

In an embodiment, in response to the farther the magnetic field sensor 50 from the magnetic field emitter 10 (for example, the larger the distance), the stronger the intensity of the target characteristic. In response to the closer the magnetic field sensor 50 to the magnetic field emitter 10 (for example, the smaller the distance), the smaller the intensity of the target characteristic.

In an embodiment, the magnetic field emitter 10 provides multiple power modes. The power modes are different voltage gains and/or current gains. For example, the peak-to-peak current amplitudes of four power modes are 68 milliamps (mA), 125 mA, 225 mA, and 550 mA, respectively. The processor 73 may select a first power mode among the power modes according to the working position, and the first power mode meets the corresponding target characteristic. That is, the electrical characteristic corresponding to the first power mode meets (is the same or close to) the target characteristic. The processor 73 may set the electrical characteristic of the magnetic field emitter 10 according to the first power mode.

It is assumed that the magnetic field emitter 10B of FIG. 2 is used, in an embodiment, the working position is that the distance between the magnetic field sensor 50 and the magnetic field emitter 10 is less than 15 cm, the peak-to-peak current amplitude of the magnetic field emitter 10 is 68 mA, and the magnetic field intensity of the space between the magnetic field emitter 10 and the magnetic field sensor 50 is about 0.8 A/m.

In an embodiment, the working position is that the distance between the magnetic field sensor 50 and the magnetic field emitter 10 is between 15 and 20 cm, the peak-to-peak current amplitude of the magnetic field emitter 10 is 125 mA, and the magnetic field intensity of the space between the magnetic field emitter 10 and the magnetic field sensor 50 is about 0.9 A/m.

In an embodiment, the working position is that the distance between the magnetic field sensor 50 and the magnetic field emitter 10 is between 20 and 25 cm, the peak-to-peak current amplitude of the magnetic field emitter 10 is 225 mA, and the magnetic field intensity of the space between the magnetic field emitter 10 and the magnetic field sensor 50 is about 1.05 A/m.

In an embodiment, the working position is that the distance between the magnetic field sensor 50 and the magnetic field emitter 10 is greater than 25 cm, the peak-to-peak current amplitude of the magnetic field emitter 10 is 550 mA, and the magnetic field intensity of the space between the magnetic field emitter 10 and the magnetic field sensor 50 is about 1.7 A/m.

In other embodiments, due to different magnetic field emitters 10 or different magnetic field sensors 50, the working positions, the electrical characteristics, and the values of magnetic field intensity may further change.

In an embodiment, if the magnetic field emitter 10 includes multiple transmitting units 11 (as shown in FIG. 2), the electrical characteristics of the transmitting units 11 may be the same. For example, when the distance between the magnetic field sensor 50 and the magnetic field emitter 10 is greater than 25 cm, the peak-to-peak current amplitude of all the transmitting units 11 is 550 mA, that is, constant current synchronous driving.

In another embodiment, the magnetic field emitter 10 includes multiple first transmitting units and multiple second transmitting units, the first transmitting units surround the second transmitting units, and the electrical characteristics of the first transmitting units are one to two times the electrical characteristics of the second transmitting units. That is to say, the intensity of the electrical characteristic of the first transmitting unit located in the outer circle may be the same as or greater than the intensity of the electrical characteristic of the second transmitting unit located in the inner circle. Taking FIG. 2 as an example, the voltage gains of the transmitting units Tx1, Tx3, Tx6, and Tx8 (i.e., the first transmitting units) may be one to two times the voltage gains of the transmitting units Tx2, Tx4, Tx5, and Tx7 (i.e., the second transmitting units), that is, non-constant current synchronous driving. In this way, the problem that the change in the magnetic field gradient decreases rapidly with height may be improved.

Figure 6A:
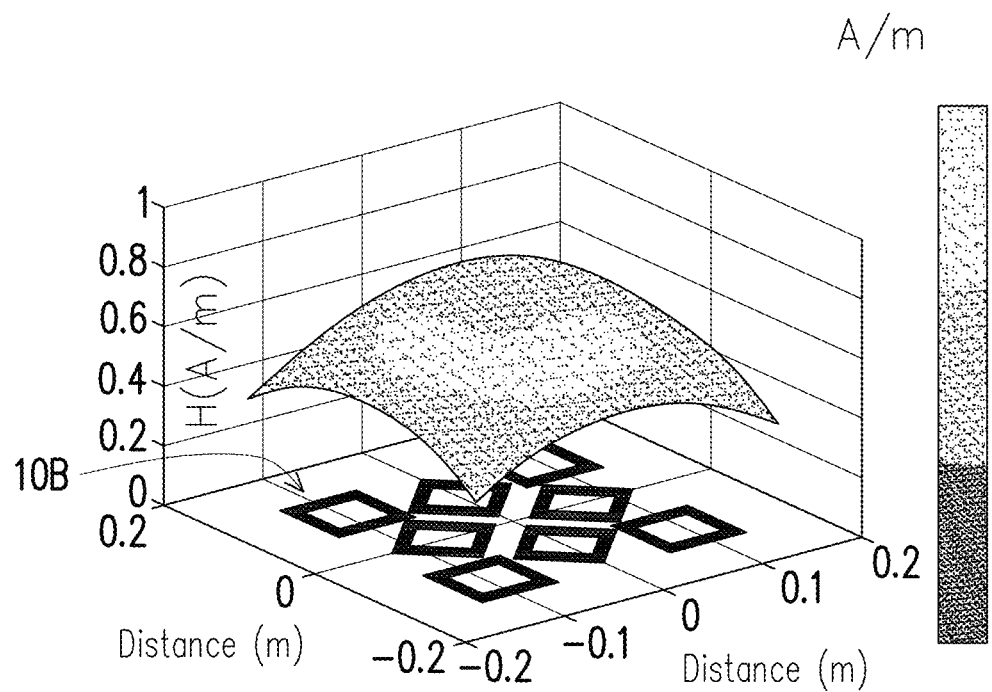
FIGS. 6A to 6D are schematic diagrams of magnetic field intensity at different sensing positions at an adjustable current gain.

FIGS. 6A to 6D are schematic diagrams of magnetic field intensity at different sensing positions at an adjustable current gain. Referring to FIG. 6A, the distance between the magnetic field sensor 50 and the magnetic field emitter 10 is less than 15 cm, and the peak-to-peak current amplitude of the magnetic field emitter 10 is 68 mA. The magnetic field intensity is about 0.4 to 0.8 A/m, and the distribution is roughly uniform (for example, the difference in signal-to-noise ratio is smaller).

Figure 6B:
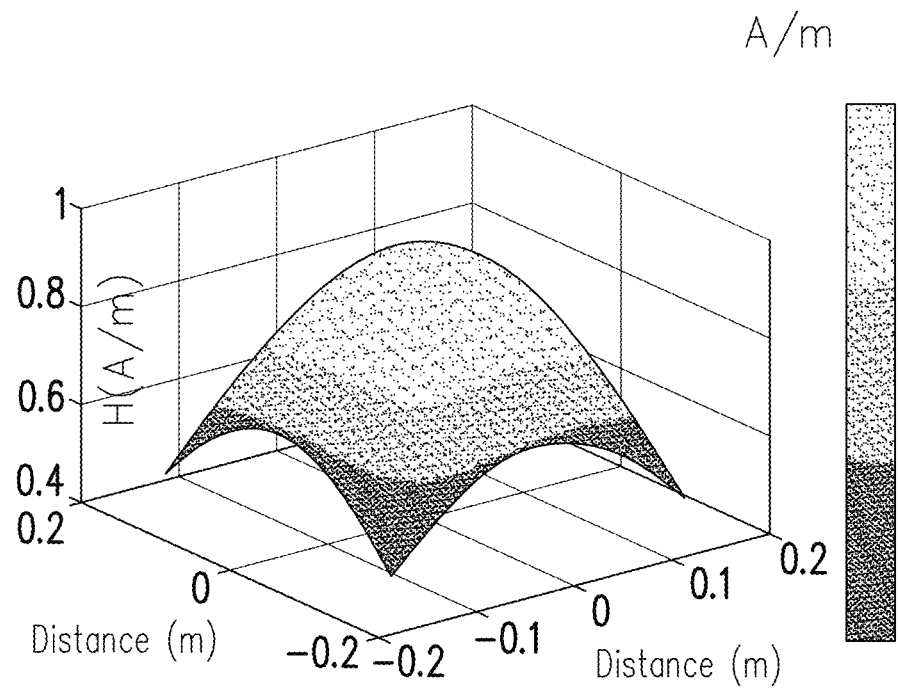

Referring to FIG. 6B, the distance between the magnetic field sensor 50 and the magnetic field emitter 10 is between 15 and 20 cm, and the peak-to-peak current amplitude of the magnetic field emitter 10 is 125 mA. The magnetic field intensity is about 0.5 to 0.9 A/m, and the distribution is roughly uniform.

Figure 6C:
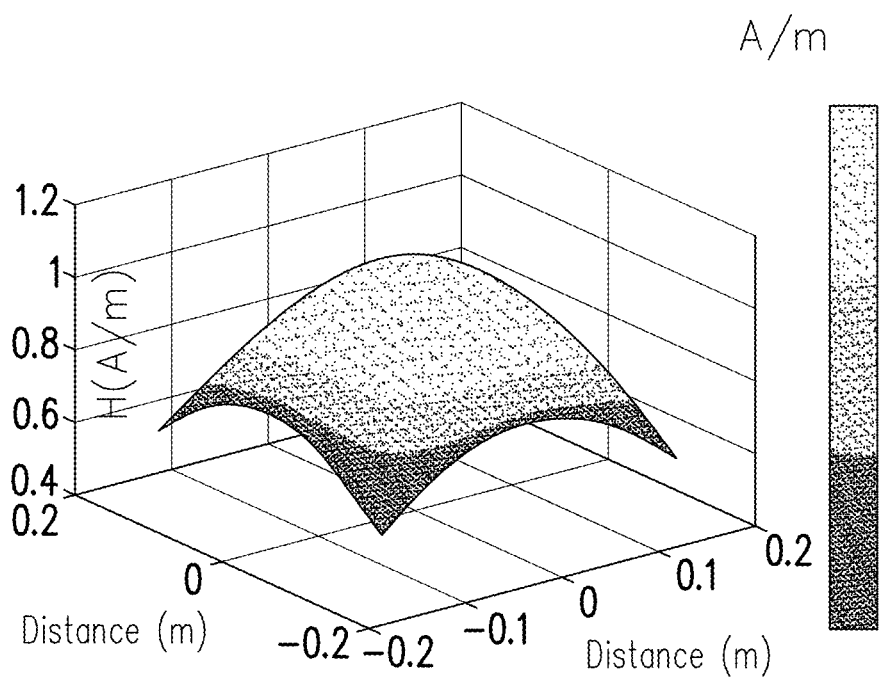

Referring to FIG. 6C, the distance between the magnetic field sensor 50 and the magnetic field emitter 10 is between 20 and 25 cm, and the peak-to-peak current amplitude of the magnetic field emitter 10 is 225 mA. The magnetic field intensity is about 0.6 to 1.05 A/m, and the distribution is roughly uniform.

Figure 6D:
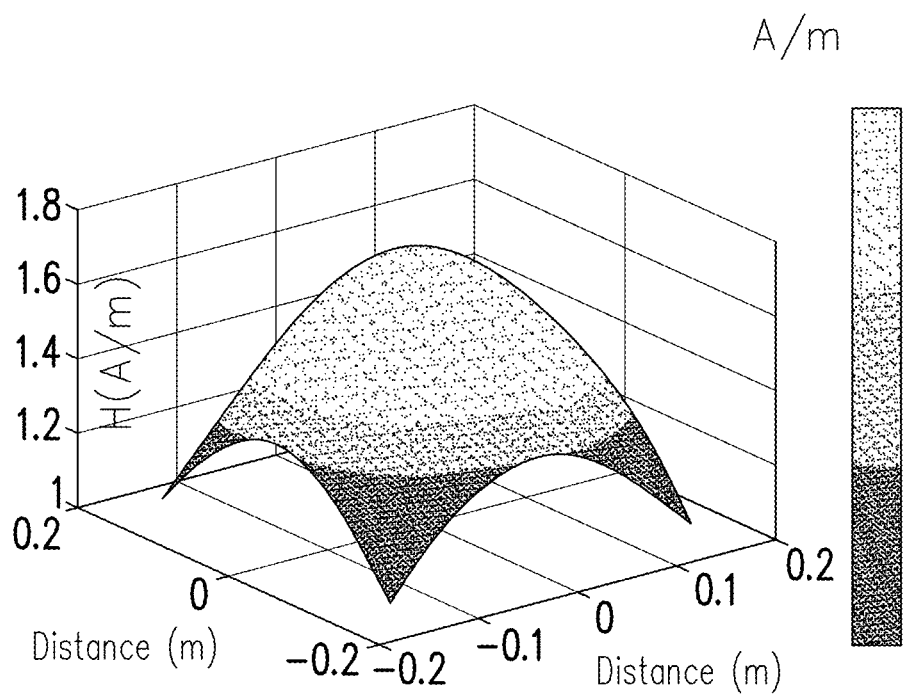

Referring to FIG. 6D, the distance between the magnetic field sensor 50 and the magnetic field emitter 10 is greater than 25 cm, and the peak-to-peak current amplitude of the magnetic field emitter 10 is 550 mA. The magnetic field intensity is about 1 to 1.7 A/m, and the distribution is roughly uniform.

In an embodiment, when the magnetic field sensor 50 is close to the magnetic field emitter 10, the processor 73 may reduce the voltage gain of the magnetic field sensor 50 to prevent the sensing signal from being saturated and causing distortion. When the magnetic field sensor 50 is far away from the magnetic field emitter 10, the processor 73 may further increase the voltage gain of the magnetic field sensor 50 to maintain the signal-to-noise ratio of the sensing signal.

In an embodiment, the processor 73 may simultaneously adjust the electrical characteristics of the magnetic field emitter 10 and the magnetic field sensor 50 according to the working position. For example, when the magnetic field sensor 50 is close to the magnetic field emitter 10, the processor 73 may reduce the voltage gains of both the magnetic field emitter 10 and the magnetic field sensor 50. For another example, when the magnetic field sensor 50 is far away from the magnetic field emitter 10, the processor 73 may increase the voltage gains of both the magnetic field emitter 10 and the magnetic field sensor 50.

In an embodiment, the processor 73 may select a corresponding magnetic field numerical model according to the target characteristic. The magnetic field numerical model records the corresponding relationship between the position in space and the magnetic flux/magnetic field intensity. Therefore, in subsequent position estimation, the processor 73 may determine the position and/or the posture of an object through the selected magnetic field numerical model.

In summary, in the control method and the controller related to electromagnetic tracking in the embodiments of the disclosure, the working position of the magnetic field sensor may be determined, and the electrical characteristics of the magnetic field emitter and/or the magnetic field sensor may be adjusted accordingly (for example, the current or voltage gains). Therefore, when the magnetic field sensor is close to the magnetic field emitter, the sensing signal is not saturated; when the magnetic field sensor is far away from the magnetic field emitter, the magnetic field gradient is still maintained. Even if the magnetic field sensor is at different positions, the signal-to-noise ratio of the sensing signal may still be improved, and the magnetic field gradient may be maintained, thereby improving the positioning accuracy within the working range and improving the user's operating space.

Although the disclosure has been described with reference to the above embodiments, the described embodiments are not intended to limit the disclosure. People of ordinary skill in the art may make some changes and modifications without departing from the spirit and the scope of the disclosure. Thus, the scope of the disclosure shall be subject to those defined by the attached claims.

What is claimed is:

1. A control method, comprising:
   determining a working position, wherein the working position is a position of a magnetic field sensor relative to a magnetic field emitter; and adjusting an electrical characteristic of the magnetic field emitter or the magnetic field sensor to a target characteristic corresponding to the working position, wherein the magnetic field emitter provides a plurality of power modes, and the control method further comprising:

selecting a first power mode among the power modes according to the working position, wherein the first power mode meets the target characteristic corresponding to thereof; and setting the electrical characteristic of the magnetic field emitter according to the first power mode.

2. The control method according to claim 1, wherein the electrical characteristic is a voltage gain of the magnetic field emitter, a current gain of the magnetic field emitter or a voltage gain of the magnetic field sensor.

3. The control method according to claim 1, wherein magnetic field intensity of a space between the magnetic field emitter and the magnetic field sensor ranges between 0.5 and 10 amperes per meter (A/m) in response to the magnetic field emitter or the magnetic field sensor operating the target characteristic.

4. The control method according to claim 1, wherein the working position is that a distance between the magnetic field sensor and the magnetic field emitter is less than 15 centimeters (cm), peak-to-peak current amplitude of the magnetic field emitter is 68 milliamps (mA), and magnetic field intensity of a space between the magnetic field emitter and the magnetic field sensor is about 0.8 A/m.

5. The control method according to claim 1, wherein the working position is that a distance between the magnetic field sensor and the magnetic field emitter ranges between 15 and 20 cm, peak-to-peak current amplitude of the magnetic field emitter is 125 mA, and magnetic field intensity of a space between the magnetic field emitter and the magnetic field sensor is about 0.9 A/m.

6. The control method according to claim 1, wherein the working position is that a distance between the magnetic field sensor and the magnetic field emitter ranges between 20 and 25 cm, peak-to-peak current amplitude of the magnetic field emitter is 225 mA, and magnetic field intensity of a space between the magnetic field emitter and the magnetic field sensor is about 1.05 A/m.

7. The control method according to claim 1, wherein the working position is that a distance between the magnetic field sensor and the magnetic field emitter is greater than 25 cm, peak-to-peak current amplitude of the magnetic field emitter is 550 mA, and magnetic field intensity of a space between the magnetic field emitter and the magnetic field sensor is about 1.7 A/m.

8. The control method according to claim 1, wherein the magnetic field emitter comprises a plurality of transmitting units, and the electrical characteristic of the transmitting units is the same.

9. The control method according to claim 1, wherein the magnetic field emitter comprises a plurality of first transmitting units and a plurality of second transmitting units, the first transmitting units surround the second transmitting units, and electrical characteristics of the first transmitting units are one to two times electrical characteristics of the second transmitting units.

10. A controller, comprising:
a communication transceiver, configured to receive a sensing value of a magnetic field sensor;
a processor, coupled to the communication transceiver, and configured for:
determining a working position according to the sensing value, wherein the working position is a position of the magnetic field sensor relative to a magnetic field emitter; and
adjusting an electrical characteristic of the magnetic field emitter or the magnetic field sensor to a target characteristic corresponding to the working position, wherein the magnetic field emitter provides a plurality of power modes, and the processor is further configured for:
selecting a first power mode among the power modes according to the working position, wherein the first power mode meets the target characteristic corresponding to thereof; and
setting the electrical characteristic of the magnetic field emitter according to the first power mode.

11. The controller according to claim 10, wherein the working position is that a distance between the magnetic field sensor and the magnetic field emitter is greater than 25 cm, peak-to-peak current amplitude of the magnetic field emitter is 550 mA, and magnetic field intensity of a space between the magnetic field emitter and the magnetic field sensor is about 1.7 A/m.

12. The controller according to claim 10, wherein the electrical characteristic is a voltage gain of the magnetic field emitter, a current gain of the magnetic field emitter or a voltage gain of the magnetic field sensor.

13. The controller according to claim 10, wherein magnetic field intensity of a space between the magnetic field emitter and the magnetic field sensor ranges between 0.5 and 10 amperes per meter (A/m) in response to the magnetic field emitter or the magnetic field sensor operating the target characteristic.

14. The controller according to claim 10, wherein the working position is that a distance between the magnetic field sensor and the magnetic field emitter is less than 15 centimeters (cm), peak-to-peak current amplitude of the magnetic field emitter is 68 milliamps (mA), and magnetic field intensity of a space between the magnetic field emitter and the magnetic field sensor is about 0.8 A/m.

15. The controller according to claim 10, wherein the working position is that a distance between the magnetic field sensor and the magnetic field emitter ranges between 15 and 20 cm, peak-to-peak current amplitude of the magnetic field emitter is 125 mA, and magnetic field intensity of a space between the magnetic field emitter and the magnetic field sensor is about 0.9 A/m.

16. The controller according to claim 10, wherein the working position is that a distance between the magnetic field sensor and the magnetic field emitter ranges between 20 and 25 cm, peak-to-peak current amplitude of the magnetic field emitter is 225 mA, and magnetic field intensity of a space between the magnetic field emitter and the magnetic field sensor is about 1.05 A/m.

* * * * *